No. 623,430. Patented Apr. 18, 1899.
R. DE SAUSSURE.
BICYCLE.
(Application filed Nov. 19, 1897.)

(No Model.)

Witnesses:
G. S. Elliott.
R. M. Elliott.

Inventor:
René de Saussure,
by
his attorney.

THE NORRIS PETERS CO., PHOTO-LITHO., WASHINGTON, D. C.

UNITED STATES PATENT OFFICE.

RENÉ DE SAUSSURE, OF BROOKLAND, DISTRICT OF COLUMBIA.

BICYCLE.

SPECIFICATION forming part of Letters Patent No. 623,430, dated April 18, 1899.

Application filed November 19, 1897. Serial No. 659,146. (No model.)

*To all whom it may concern:*

Be it known that I, RENÉ DE SAUSSURE, a citizen of the United States, residing at Brookland, in the District of Columbia, have invented certain new and useful Improvements in Bicycles; and I do hereby declare the following to be a full, clear, and exact description of the invention, such as will enable others skilled in the art to which it appertains to make and use the same.

The object is in a ready, efficient, and thoroughly-practical manner to take up all jar and shock resulting from contact with obstructions incident to and attendant upon travel over a road, thereby at once obviating the destructive racking to which a bicycle is subjected and affording increased comfort to the rider; furthermore, to direct the effect of all impact to a part of the bicycle where it will be least felt and where the smallest damage can be done; furthermore, to cause the rim of the wheel under all conditions in use to occupy a plane perpendicular to the axle and to attain this object without interference with the action of the cushion or the rotation of the wheel, and, finally, while deriving all the advantages, ease, and comfort incident to the use of a pneumatic tire to render it possible to dispense with its employment, thereby avoiding the disadvantages attending its use.

With these objects in view the invention consists in the novel construction and combination of parts of a bicycle-wheel bearing, as will be hereinafter fully described and claimed.

In the accompanying drawings, forming a part of this specification, and in which like letters of reference indicate corresponding parts, I have illustrated two forms of embodiment of my invention, it being understood that other forms of embodiment thereof may be employed without departing from the spirit thereof.

Figure 1:
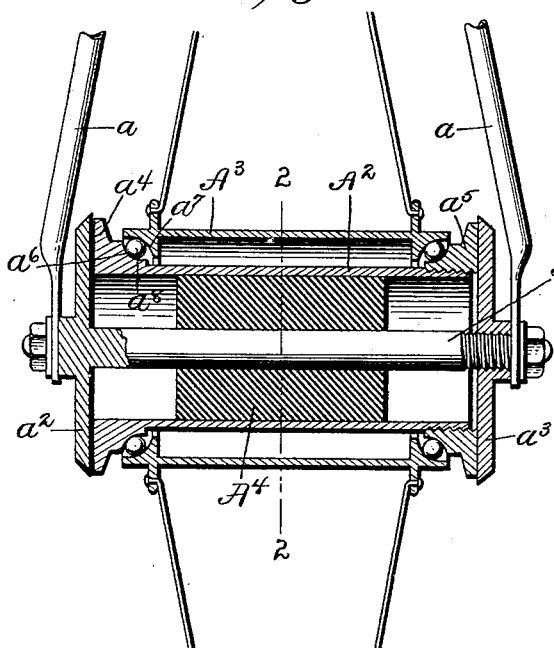
Figure 2:
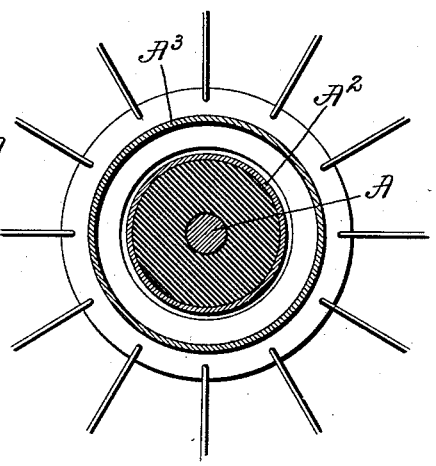
Figure 3:
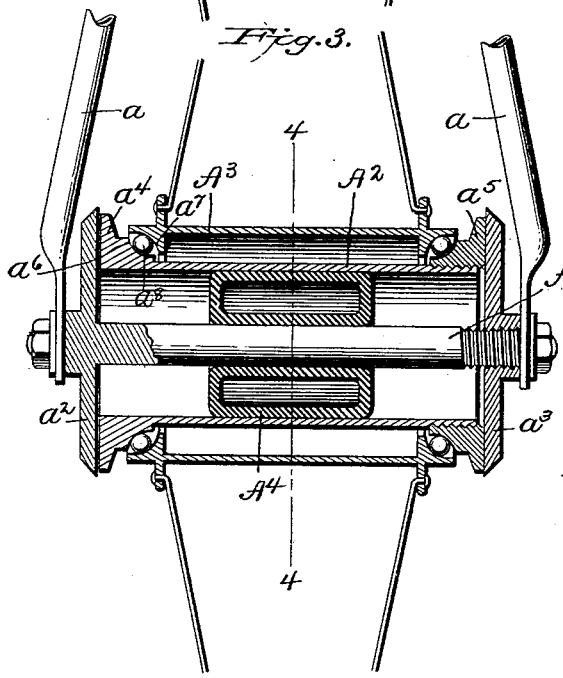
Figure 4:
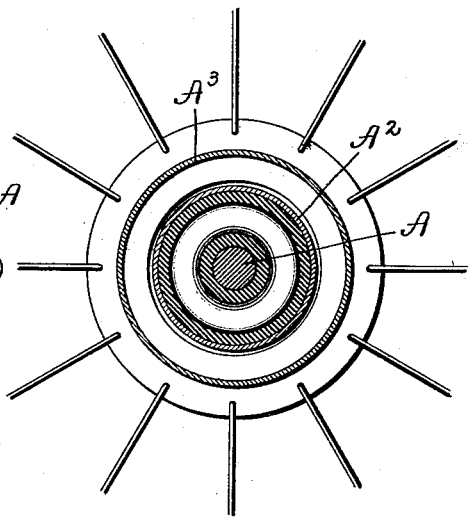

In the drawings, Figure 1 is a view in sectional elevation displaying a wheel-bearing employing a solid-rubber cushion. Fig. 2 is a transverse sectional view taken on the line 2 2, Fig. 1. Fig. 3 is a view similar to Fig. 1, displaying a wheel-bearing employing a pneumatic cushion. Fig. 4 is a transverse sectional view taken on the line 4 4, Fig. 3.

Referring to the drawings, A designates an inner axle rigidly fixed to the fork members $a$; $A^2$, an outer hollow axle; $A^3$, the hub, and $A^4$ the cushion, which may be either of the solid-rubber type, as shown in Fig. 1, or of the pneumatic type, as shown in Fig. 2.

The inner axle is provided at each end with a flange, that at one end of the axle, as at $a^2$, being by preference integral with the axle and that at the other end, as at $a^3$, being removable therefrom and constituting an assembling-nut. The outer axle is similarly provided with flanges, one, as $a^4$, being by preference integral with the axle and the other, as $a^5$, being removable and constituting a ball-bearing-adjusting nut, the flanges of the two axles by coaction serving to hold the said axles in exact parallelism, and thereby to keep the rim of the wheel under all conditions in use perpendicular to the axle without interference with the action of the cushion or the rotation of the wheel. The outer axle, adjacent to the flanges $a^4\,a^5$, is provided with grooves or ways $a^6$, adapted to register with similar grooves or ways $a^7$ in the hub $A^3$, and in these pairs of alined grooves are mounted ordinary ball-bearings $a^8$, proper adjustment of these bearings, as before stated, being effected by the nut $a^5$.

In Fig. 2 the same general arrangement of parts is employed as that described, except that I employ a pneumatic cushion or cushions in lieu of the solid cushion $A^4$, suitable means being provided for permitting inflation of the cushion or cushions.

Having thus fully described my invention, what I claim as new, and desire to secure by Letters Patent, is—

1. A wheel-bearing, comprising an inner axle fixed rigidly to the frame and provided with flanges, an outer axle carrying the hub of the wheel, the latter axle having flanges coacting with those of the inner axle, whereby to hold the two axles in parallelism, and a cushion acting between the inner and the outer axle, substantially as described.

2. A wheel-bearing, comprising an inner axle fixed rigidly to the frame and provided with flanges, an outer axle carrying the hub of the wheel, the latter axle having flanges coacting with those of the inner axle, whereby to hold the two axles in parallelism, and a pneumatic cushion acting between the inner and the outer axle, substantially as described.

In testimony whereof I affix my signature in presence of two witnesses.

RENÉ DE SAUSSURE.

Witnesses:
R. G. DYRENFORTH,
R. M. ELLIOTT.